United States Patent [19]

Long et al.

[11] 4,380,009
[45] Apr. 12, 1983

[54] MESSAGE COMMUNICATION SYSTEM

[75] Inventors: Ernest L. Long, San Jose; William S. Duvall, Portola Valley; Donald P. Allen, Menlo Park, all of Calif.

[73] Assignee: Amtel Systems Corporation, Sunnyvale, Calif.

[21] Appl. No.: 125,844

[22] Filed: Feb. 29, 1980

[51] Int. Cl.³ .................... H04L 15/34; H04Q 9/00
[52] U.S. Cl. .................... 340/825.55; 340/310 R; 340/711; 340/799; 340/802; 178/4.1 R; 340/825.44
[58] Field of Search .................. 340/151, 147 R, 152, 340/149 A, 711, 799, 310 R, 147 P, 721, 310, 789, 717, 825.44, 802, 310 A, 825.55; 178/2 R, 3, 4.1, 23 R, 22, 23, 30; 375/119, 81; 307/262

[56] References Cited

U.S. PATENT DOCUMENTS

| | | | |
|---|---|---|---|
| 3,593,293 | 7/1971 | Rorholt | 340/152 R |
| 3,990,046 | 11/1976 | Katz et al. | 340/147 R |
| 4,027,099 | 5/1977 | Streeter et al. | 178/23 R |
| 4,071,780 | 1/1978 | Burnett | 307/262 |
| 4,092,599 | 5/1978 | Yee et al. | 340/310 R |
| 4,095,045 | 6/1978 | Johnson et al. | 178/2 R |
| 4,130,861 | 12/1978 | LaForest | 340/310 R |
| 4,173,754 | 11/1979 | Feiker | 340/310 R |
| 4,216,544 | 8/1980 | Boleda et al. | 375/119 |
| 4,218,738 | 8/1980 | Matyas et al. | 340/149 A |
| 4,251,858 | 2/1981 | Cambigue et al. | 340/147 P |

*Primary Examiner*—Donald J. Yusko
*Attorney, Agent, or Firm*—Flehr, Hohbach, Test, Albritton & Herbert

[57] ABSTRACT

A message communication system which provides instant messages and memoranda at a telephone user's desk. In an office complex, a message is transmitted over pre-existing office power lines to printers located in a user's office and is automatically posted with time of day, date and sequence number. When a telephone call cannot be completed, messages are entered at the terminal by a telephone operator or message attendant. A computer automatically formats message forms and stores the text on a magnetic diskette. Messages are transmitted to outlying printers and can be recalled for display or resending at any time.

41 Claims, 19 Drawing Figures

FIG.—18

MESSAGE COMMUNICATION SYSTEM

CROSS-REFERENCE TO RELATED APPLICATION

"Thermal Message Printer," Ser No. 125,846, filed Feb. 29, 1980, and assigned to the same assignee as the present invention.

BACKGROUND OF THE INVENTION

The present invention relates to a message communication system.

In the modern business environment, problems occur in connection with relaying information and messages to particular personnel in an office complex.

Statistical analyses have shown that a very large percentage of business telephone calls are not completed for various reasons, e.g., the desired person is busy with another telephone call or has stepped out of the office. Relaying important information and messages include such archaic methods as "pink" slips, which are generally relayed from an office's receptionist to either the desired person or secretary. Obvious problems with such an approach are that information and messages are frequently delayed or lost. They are often incomplete and the handwriting difficult to decipher.

Additionally, with the introduction of data processing equipment into the modern business environment, there is a need for improved methods of relaying messages, memoranda and automatic reminders to keep pace with the high-speed capabilities of the processing equipment and the requirement to enter data on schedule.

In view of the above background, it is an objective of the present invention to provide an improved message communication system.

SUMMARY OF THE INVENTION

The present invention relates to a message communication system.

The system provides the capability for message entry, transmission, magnetic recording (filing) and subsequent retrieval that can be understood quickly and is simple to operate. In an office complex, the system provides an instant display of who is calling a particular person, or who has called, directly at a user's desk. It also provides an electronic mail capability, enabling memoranda to be sent to individuals or to distribution lists.

Another feature is the automated dispatching of data reminders. This calender capability provides advance notification of important dates by individual, including meetings, due dates for reports or documents, court calendar, anniversaries and the like, whether for a single occasion or periodic scheduled events or needs.

The system includes a keyboard and video display terminal which communicates with a central processing unit and disk drive. A magnetic diskette stores the directory of users and files of all messages sent, arranged by user. Each message is automatically posted with time of day, date and sequence number, so there is an audit trail for all message entries.

In one embodiment, messages are sent over the office power lines to printers which are located in the user's office. A central line printer is included to supply permanent printed file records that tabulate all messages by user. These records provide history files for future access.

In accordance with the above summary, the present invention achieves the objective of providing an improved message communication system.

Other objects and features of the present invention will become apparent from the following detailed description when taken in conjunction with the accompanying drawings.

SYSTEM OVERVIEW

In order to illustrate the operation of the message communication system according to the present invention, a system overview will be described in conjunction with the block diagram depicted in FIG. 1.

The system provides the capability for message entry, transmission, magnetic recording (filing) and subsequent retrieval.

The message communication system provides an instant printed display of who is calling or who has called right at a user's desk. It also provides an electronic mail capability, enabling memoranda to be sent to individuals or to distribution lists.

Another feature is the automated dispatching of daily reminders. This "calendar" capability provides advance notification of important dates by individual, including meetings, due dates for reports or documents, court calendar, anniversaries and the like, whether for a single occasion or periodic events.

Figure 1:
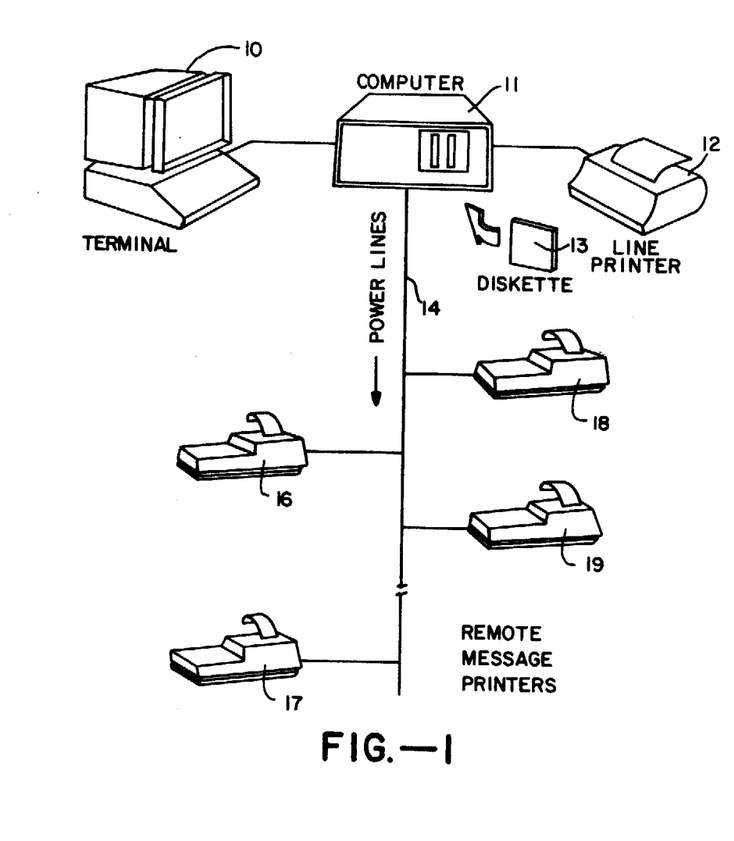
FIG. 1 depicts a block diagram of a message communication system according to the present invention.

Referring to FIG. 1, the central elements of the system are one or more keyboards and video display terminal(s) 10 which communicate with a compact computer and disk drive 11, which typically is a North Star Horizon. A magnetic diskette 13 stores the directory of users and files all of the messages sent, arranged by user. Each message can automatically be posted with time of day, date and sequence number. Messages are sent over a transmission medium such as office power lines 14 to remote message printers 16–19 which are typically located in a user's office.

A central line printer 12 supplies permanent printed file records that tabulate all messages by user. These records provide history files for future access.

When a telephone call cannot be completed, messages are entered at the terminal 10 by a telephone operator or message attendant. Computer 11 automatically formats message forms and stores the text on diskette 13. Messages are transmitted to outlying printers 16–19 as necessary and can be recalled for display or resending at any time.

Each printer depicted in FIG. 1 can be designed to mount under a telephone and each has one or more unique addresses and can be plugged in anywhere in the office complex. The address is pre-assigned to the user and provides him with a private channel of communication for his messages.

In FIG. 1, the message system provides a printing communication service within an organization. Telephone calls that are not completed can be handled by a central attendant who transmits the caller's message to the printer on the desk of the person called. Such messages are also stored in diskette memory 13 for later retrieval. Memory 13 could be any conventional type of storage device, such as a random access memory(RAM), bubble memory, or hard disk. Printers can be assigned to one person or small groups with lower individual traffic.

Standard message forms are displayed on terminal 10 which are is merely filled in by the attendant. A single stroke of a key causes a standard message such as "Please call," "Urgent," or "Returned your call" to be transmitted. All formats are automatically created by computer 11 under software control. Users can be addressed by formal names, nicknames, initials and the like. All messages are given time of day and date and a sequence number is also assigned by person. This sequencing prevents a missed message.

Messages or memoranda can be sent to individuals or distribution lists of individuals with a single entry into a form. Status of individuals (e.g., "In plant 7" or out until 3 P.M.") is automatically displayed to the attendant.

The system is capable of automatic prompting. Not only does the system present formats for filling in, but if a newly trained operator forgets how to perform a particular action, such as adding a new person to the directory or retrieving a previously sent message, instructions are automatically displayed by striking the question mark key on terminal 10, so that substitute personnel can operate the system with little instruction.

All messages sent can also be stored on diskette 13. They can be retrieved by the attendant at any time, providing the function of long term answering service and history file. Messages can be retransmitted singly or in groups to any location in the building. They can be retrieved at any time in the future by inserting an "archive" diskette.

A capability for automatic calendar-related reminders is incorporated in the system. Messages pertaining to important dates such as report due dates, court dates, anniversaries, periodic meetings and the like are sent at prescribed intervals before the date. For example, they can be sent only once or automatically on dates representing a prescribed frequency, such as weekly, monthly, quarterly, and the like.

Line printer 12 provides an option for making a permanent printed file copy of all messages received, during any specific period organized by the addressee.

If a user is out of the office, he can call in and have his message file read to him by the attendant, who views them on the screen of terminal 10 as with an answering service. Printed copies are on his desk upon the user's return.

When a user is going to be in another office for a meeting, he can have his messages forwarded to that office on a temporary basis. They are printed in both locations and routing automatically rescinded after a fixed period.

The system can send an announcement or memorandum to specific groups of addressed user printers or to all users as organized by distribution lists, with a single entry.

Visitor messages can be accommodated by the system in the same fashion as permanent users. The visitor is assigned a printer number where his messages are sent. If the person is visiting for a short time, or if he has not been assigned a printer, his messages are automatically held in a special file and can be recalled for display or printing.

In accordance with one embodiment of the invention, an advantage of incorporating the message communication system is that installation is simple and rapid. With communication on power lines, installation does not require additional office wiring, leasehold improvements or telephone system changes. Additionally, the system is rapidly learned and has built-in self-training features. Most operators can use the system in minutes and are proficient in less than a day.

Transmitter

Figure 2:
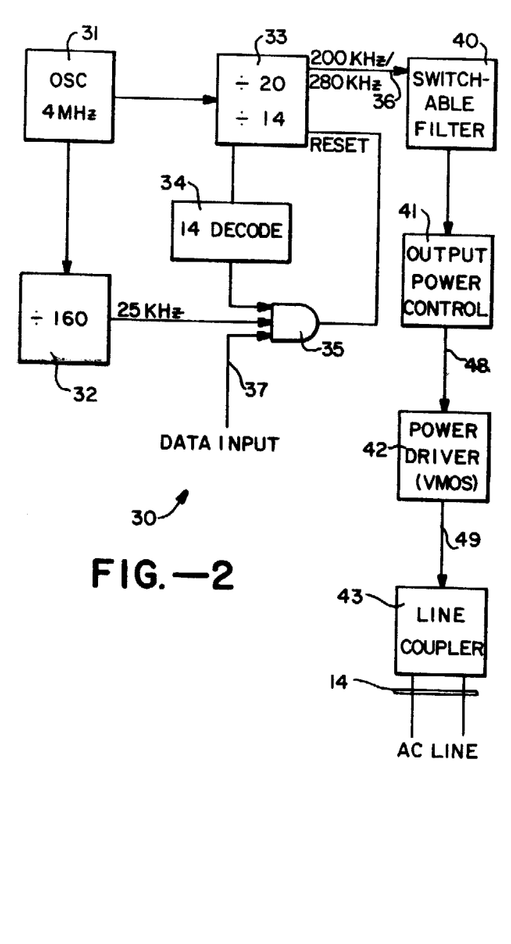
FIG. 2 depicts a block diagram of a transmitter.

Referring now to FIG. 2, a block diagram is depicted of a transmitter 30 for transmitting message information to remote printers 16-19 of FIG. 1. Transmitter 30 could be contained within computer 11 of FIG. 1.

In FIG. 2, oscillator 31 generates a 4 MHz signal for connection to divider circuits 32-33. Divider circuit 32 is a divide by 160 circuit for generating a 25 KHz signal for connection to logical AND gate 35. Divider circuit 33 divides the 4 MHz signal from oscillator 31 by 20 and 14, thereby generating 200 KHz and 280 KHz signals on bus 36.

Divider circuit 33 (which typically includes decade counters) provides through decoder circuit 34 a decode signal for connection to logical AND gate 35 when divider circuit 33 has counted to count "14".

Logical AND gate 35 also receives data input in the form of a message on bus 37, which typically could be ASCII format, techniques which are known in the art.

In FIG. 2, in order to generate a message signal which will correspond to the data input signal on bus 37 (in ASCII format) divider circuit 33 generates two discrete carrier frequencies (200 KHz and 280 KHz) to correspond to the changing binary states of the data input signal on bus 37 (although the system could utilize frequency shift keying techniques to modulate the carrier signal to form composite first and second states representing the modulated message signal).

In a preferred embodiment, a logical "1" is represented by a 280 KHz signal and a logical "0" is represented by a frequency modulated signal varying between 200 KHz and 280 KHz at a 25 KHz rate. The system typically uses ASCII techniques with the input data representing a message in RS232 format, in which a low state of the input data represents a logical "1", and a high state represents a logical "0".

In order to achieve such a message signal, if the data input signal (in RS 232 format) is low, divider circuit 33 will generate a 280 KHz signal to correspond to the "low" state.

If the data input signal is high, divider circuit 33 divides the 4 MHz signal by 14 for the positive half of the 25 Hz signal and divides the 4 MHz signal by 20 for the negative half of the 25 KHz signal. This continues as long as the data input signal is high.

Accordingly, the carrier signal generated on bus 36 will be an unmodulated 280 KHz square wave signal corresponding to a logical "1" on input bus 37 and will vary between 200 KHz and 280 KHz at a 25 KHz rate for a logical "0" on bus 37. By utilizing a common 4 MHz signal, it has been found that a phase coherency exists between the carrier signal and the message signal (i.e., the zero crossings of the 25 KHz and 200/280 KHz signals are phase coherent). In one embodiment, this phase coherency provides the system with the capability of utilizing existing power lines in an office complex without the requirement of installing special equipment for transmitting messages.

The modulated carrier signal is connected to switchable filter 40, which receives the squarewave modulated carrier signal and converts it to a sinusoidal frequency modulated signal (with harmonics) below 455 KHz, as required by FCC regulations.

Switchable filter 40 can be viewed as a variable tank circuit responsive to the 200 KHz and varying 200-280 KHz states on bus 36.

The sinusoidal waveform is connected to output power control circuit 41 (typically including a potentiometer) and to VMOS power driver circuit 42 for generating power signals for connection to line coupler circuit 43.

Line coupler circuit 43 typically uses transformer coupling to connect the frequency modulated sinusoidal carrier signal to the antenna or signal distribution lines, such as conventional AC power line 14, in order that the signal may be easily transferred to the desired remote printing location somewhere in the office.

Receiver

Figure 3:
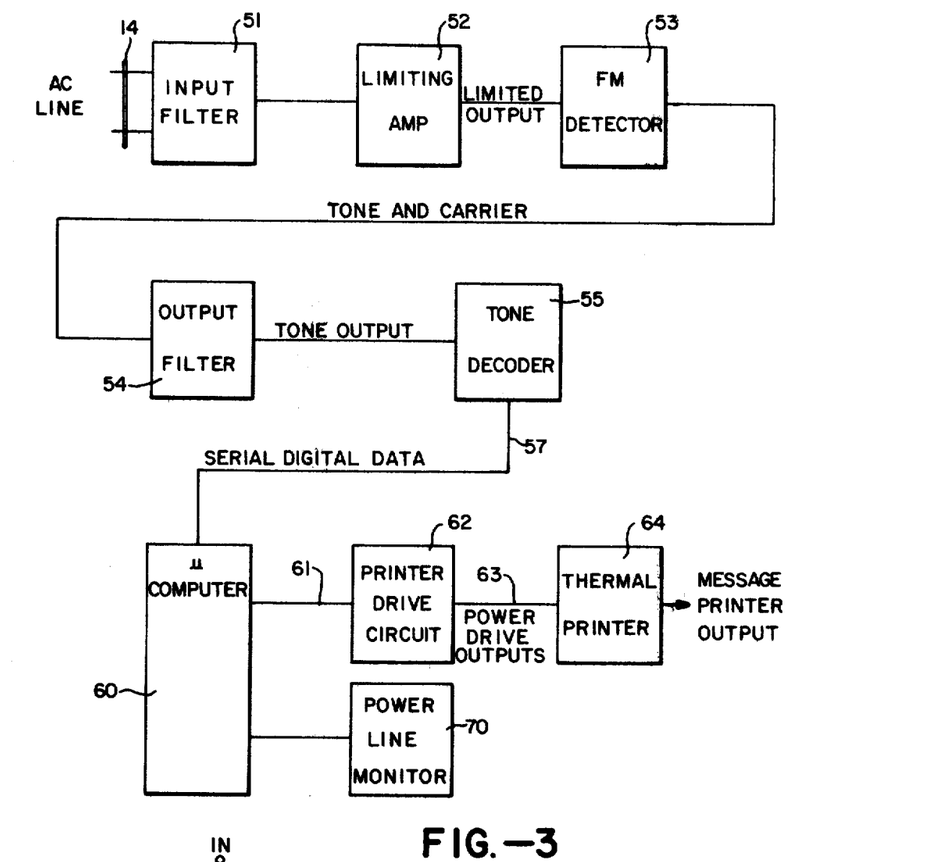
FIG. 3 depicts a block diagram of a receiver.

Referring now to FIG. 3, a block diagram of a receiver for utilization with the communication system is depicted.

In FIG. 3, the transmitted frequency modulated message signal is transmitted on the conducted medium such as AC line 14 to a receiver.

In FIG. 3, the received signal on bus 14 is connected to input filter 51, which typically is a low Q input filter (Q approximately 5) in order to provide an improved signal/noise ratio. Low Q filter 51 solves problems of ringing, which can be the source of false data, and which can occur in the event of extraneous noise, impulses and the like.

The band limited signal from filter 51 is connected to limiting amplifier 52 and FM detector 53 (typically 2111) for generating a tone and carrier signal for connection to output filter 54.

Limiting amplifier 52 generates a square wave signal corresponding to the sinusoidal input signal, and FM detector 53 is a quadrature slope detector for generating 25 KHz tone corresponding to a logical "0" and where no tone corresponds to a logical "1".

Output filter 54 receives the detected signal and removes the carrier signal from the decoded signal thereby generating a message signal for connection to tone decoder 55.

Tone decoder 55 incorporates phase lock loop techniques in order to generate a serial digital data signal on bus 57.

In one embodiment, tone decoder 55 receives the phase-coherent frequency modulated sinusoidal carrier signal and utilizes improved means for accurately detecting the presence of a message even if transmitted through severe noise and signal loss typical of conventional AC power line lines pre-existing in the office complex.

In FIG. 3, the serial digital data signal from decoder 55 is connected to microcomputer or microprocessor 60 via bus 57. As will be described, microprocessor 60 generates appropriate drive control signals on bus 61 which correspond to the message information in the serial digital data signal on bus 57.

The drive control signals on bus 61 are connected to printer drive circuit 62 which in turn generate power drive output signals on bus 63 for connection to thermal printer 64, which, as will be described, is a modification of a thermal printer circuit such as Texas Instruments' fixed head printer.

The message received via power line 14 is then printed in hard copy form by printer 64, thereby informing a user of a message such as in the form of a waiting telephone call. The power line is monitored and a controlled shut down and start up is provided by power line monitor 70 at low line conditions.

Figures 4, 5, 6:
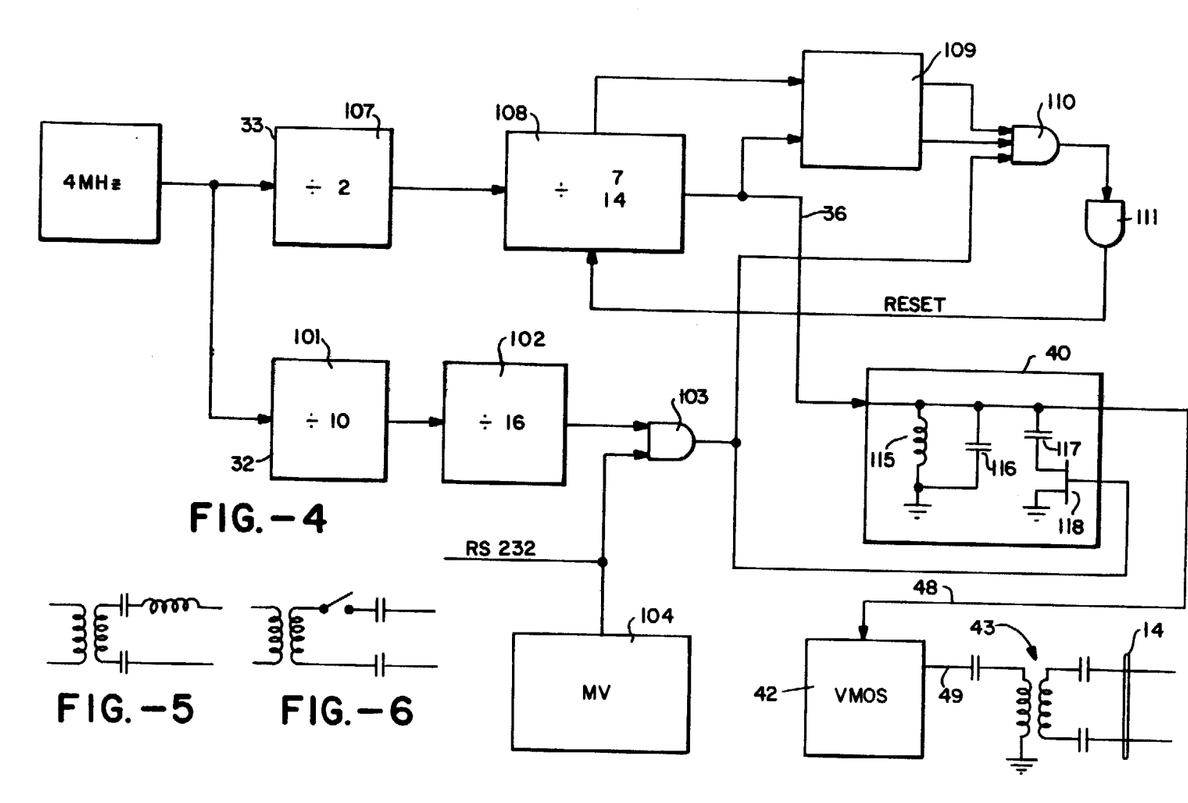
FIGS. 4–6 depict schematic diagrams of portions of the transmitter of FIG. 2.

Referring now to FIG. 4, a more detailed schematic diagram of the transmitter is depicted.

In FIG. 4, the 4 MHz signal from oscillator 31 is connected to divider circuits 32, 33. Divider circuit 32 includes a decade counter circuit 101 for generating a 0.4 MHz signal which is connected to 4-bit counter 102, which generates the 25 KHz signal previously described. The 25 KHz signal is input to AND gate 103 together with the data input signal in ASCII format on bus 37. One shot multivibrator 104 permits the transmitter to drop off line in a predetermined period of time upon termination of the message signal.

Divider circuit 33 includes flipflop 107 which generates a 2 MHz signal for connection to decade counter circuit 108, which provides the further division functions of divide by seven or divide by ten.

One output of counter circuit 108 is input to flipflop 109, which corresponds to decoder circuit 34 of FIG. 2.

In FIG. 4, the output of flipflop 34 forms an input to logical AND gate 110 which also receives the output of AND gate 103 and which forms the reset signal through AND gate 111.

In FIG. 4, by using a common 4 MHz signal for generating the discrete carrier frequencies, it is possible to provide phase coherency between the information or message signal input on bus 37 (in ASCII RS 232 format) and the carrier frequencies (200 KHz and 280 KHz).

This is achieved because the zero crossing points of the 25 KHz and 200/280 KHz are phase coherent. In one embodiment, the phase coherency of the present invention provides the capability of transmission of message information in low signal-to-noise conducted or radiated media such as over pre-existing conventional power transmission lines situated in the office environment and obviates the need for installing extra wiring and special connections.

The squarewave modulated signal on bus 36 is connected to switchable filter 40, which includes inductor 115 and capacitors 116, 117 to form a variable tank circuit for converting the squarewave on bus 36 to a sinusoidal waveform.

This switching capability is achieved through the use of FET switch 118, which switches capacitor 116 in parallel with capacitor 117 to change the resonant frequency of the tank circuit from 200 KHz to 280 KHz, depending upon the output of gate 103.

The output of filter 40 in FIG. 4 is connected through an output power control circuit to power driver circuit 42, which includes VMOS FETS, the switching of which are controlled by a crossover diode.

Figure 4A:
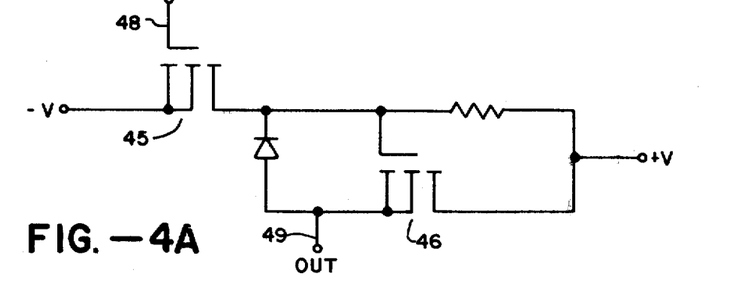

In FIG. 4A, a more detailed schematic representation of a VMOS power circuit is depicted, in which the message signal is input to VMOS FET 45, 46, the switching of which are controlled by cross-over diode 47 in a manner to produce a Class "B" effect. This gives power circuit 40 a very fast switching capability, since no storage effect is apparent as would be with conventional bipolar devices. Also, the use of the VMOS FET's 45, 46 provides increased tolerance for any power overload.

In FIG. 4, the power outputs of VMOS circuit 42 are then coupled to AC power line 14 via transformer 43. The transformer coupling could be modified to include an option as depicted in FIG. 5, which depicts a tuned output circuit to provide for transmission of messages with N transmitters at different frequencies or, as in FIG. 6, for N transmitters at the same frequency, utilizing a relay.

Figures 7, 8:
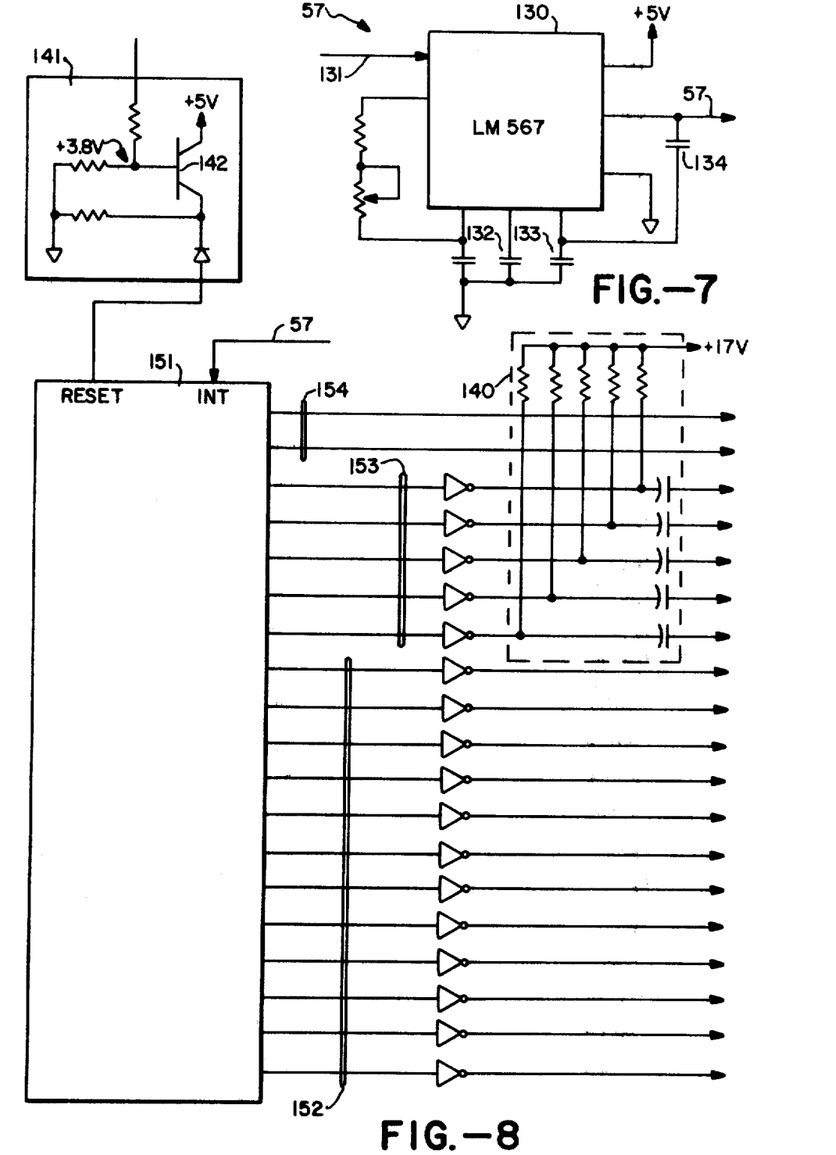
FIG. 7 depicts a tone decoder which forms a portion of the receiver in FIG. 3.
FIG. 8 depicts a schematic diagram of a portion of the receiver of FIG. 3.

Referring now to FIG. 7, the tone decoder 55 of FIG. 3 is depicted in schematic detail. Tone decoder 55 includes a general purpose tone decoder 130 such as National's Model LM567, which is connected to receive the tone output signals on bus 131 from output filter 54 of FIG. 3.

In FIG. 7, the output of tone decoder 130 is modified by capacitor 132, which is typically 8.2 nF. In order to provide accurate detection of the phase coherent frequency modulated sinusoidal carrier signal, it is necessary for tone decoder 55 to first look at the phase of the incoming signal on bus 131 and compare that signal with its own internally generated VCO signal as quickly as possible. Capacitor 132 provides a time constant that will enable the DC control voltage to change the VCO output of decoder 130. In typical operation, capacitor 132 controls the change of DC control voltage within approximately 0.1 milliseconds in order to match to the incoming frequency.

Because the present invention can be utilized with conventional power transmission lines, noise transients could be of sufficient amplitude to enable the decoder 130 to lock on to an undesirable noise impulse.

Therefore, capacitor 133 (typically 0.068 uF) is provided to add a time constant of approximately 0.5 milliseconds before determining whether the incoming signal and the VCO signal are in phase. If so, decoder 130 determines that the VCO and the incoming signal are in phase. Capacitor 134 (typically 0.01 uF) is provided to insure that the phase lock loop (PLL) will stay locked to the incoming signal for approximately 0.5 ms once locked on. This enables the detector to tolerate an input signal "dropout" or overload without losing lock.

The above modifications to tone decoder 133 enable the system to avoid the problems of noise glitches, spiked noises and the like, and thereby enable the accurate detection of a modulated carrier signal even though transmitted over noisy media such as power transmission lines.

Referring now to FIG. 8, a portion of the receiver circuit of FIG. 3 is depicted in schematic detail in which microprocessor 151 (typically Intel's 8035 together with associated peripheral devices) is connected to receive the serial digital data signal on bus 57 from tone decoder 55 of FIG. 7 into the interrupt (INT) pin of processor 151.

Microprocessor or microcontroller 151 looks at the leading edge of the first bit of the digital data stream (typically an ASCII format) to check the format. Microcontroller 151 looks at the bit duration of the first start pulse, and upon proper duration will proceed with checking the digital data stream to determine the appropriate unique address and message contained therein.

In one embodiment, each character printed by the thermal printer 64 of FIG. 3 is represented by a 5×5 matrix of dots, although any size matrix (N×M) could be utilized. Thermal printer 64 provides "sideways" printing in a format of 12 characters per column, where each character comprises a 5×5 matrix. This provides a wide block of text (e.g., 80 characters) comprised of 12 lines per block, yet is produced with low cost print heads.

Microcontroller 151, upon receiving a valid address signal, sends drive control signals on 12-bit bus 152 to sequentially enable the appropriate column corresponding to thermal printer 64 of FIG. 3.

Microcontroller 151 also sends "dot" enable signals on 5-bit bus 153 which enables the appropriate "dots" for the respective character of the column. The appropriate formatting can be done either at the central processing unit 11 of FIG. 1 or at the microcontroller 151 of FIG. 8.

Motor control are sent on bus 154 to the thermal printer stepper motor (not shown) in order to properly advance the paper feed through the printer.

Head protection of the thermal printer is provided by circuit 140, since if the microcontroller 151 is lost somewhere in its program, the random turning on of a head is avoided by providing capacitive coupling in circuit 140 to insure that the appropriate head driver leads are not kept in an on state.

Power line monitor circuit 141 of FIG. 8 is provided to reset the microcontroller 151 to the beginning of the program in the event that the +5 voltage supply falls to a level less than +4.5 volts when compared in transistor 142. Power line monitor 141 thereby provides for an orderly shut down and restart up of the operation of microcontroller 151, which prevents marginal operation of the printer should the voltage level fall below a predetermined level. This insures proper operation of the microcontroller 151.

A more detailed sequence of operation of the message receiver 64 will be discussed in conjunction with the flow chart depicted in FIGS. 9-13.

Referring now to FIGS. 9-13, there is depicted therein flow charts illustrating the operation of the system.

Figure 9:
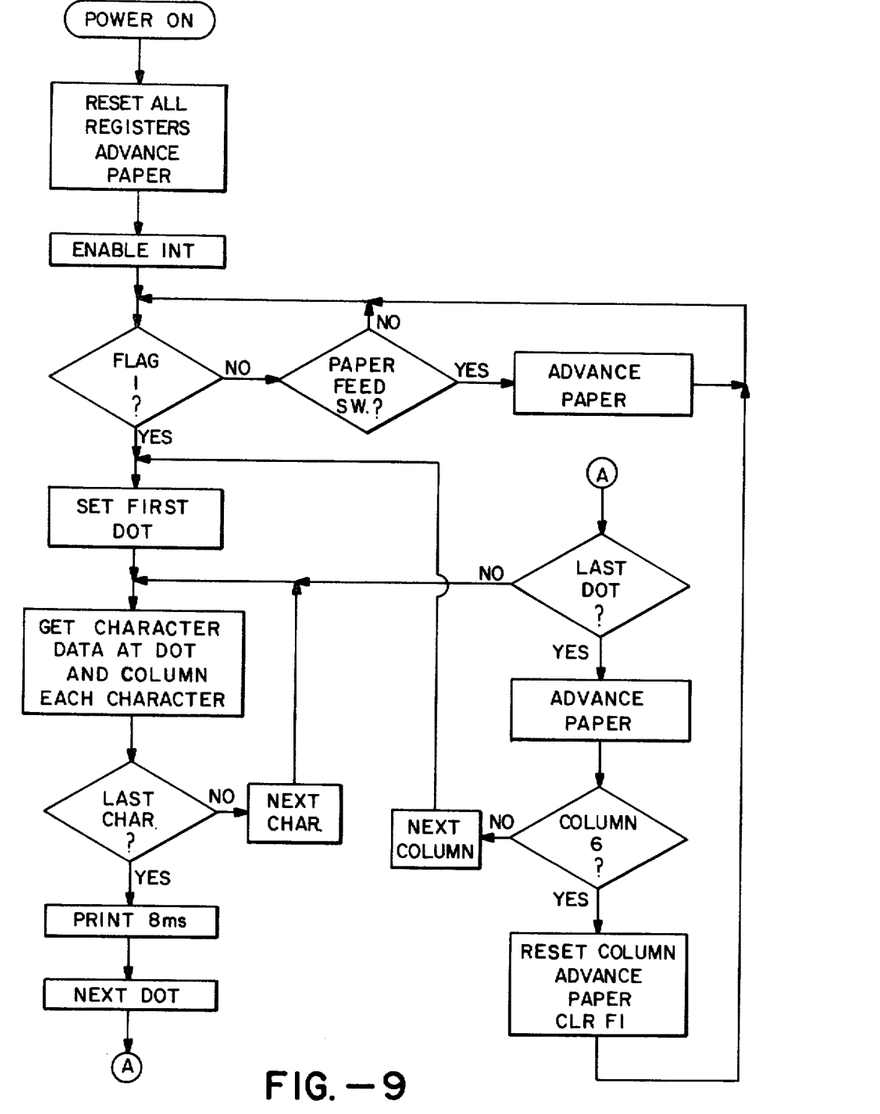
FIGS. 9–13 depict flow charts for describing the operation of the printer of FIG. 1.

In FIG. 9, when power is turned on, the microprocessor 151 of FIG. 8 resets its internal registers and flags.

Also, microprocessor 151 advances the paper in the printer by generating a control signal for the stepper motor in order to advance one line and synchronize motor and paper position.

The next step is to enter the enable interrupt loop, in which the system determines whether or not FLAG 1 is set, which is an indication whether data is ready to be printed. If FLAG 1 is not set, a paper feed switch loop is entered to advance paper and return to FLAG 1.

If FLAG 1 is set, the system enters the loop to determine which dots for each column of characters are to be printed. The Set First Dot loop initializes the character generation routine. In one embodiment, since twelve characters per column are printed, the system determines whether the left uppermost dot of each 5×5 matrix for each character is to be printed or not. The Set First Dot loop will determine for each character in sequence whether a particular dot of the 5×5 matrix is to be printed. When the system has gone through twelve characters, the Print for 8 ms step will turn on, as required, the appropriate dot for each of the twelve characters.

The system then advances the dot counter and goes to step "A" to determine whether the last dot has been determined and if so advances the paper. Since the preferred embodiment utilizes a 5×5 matrix, the column 6 step, when reached, resets the column, advances the paper and clears the F1 flag.

Figure 10:
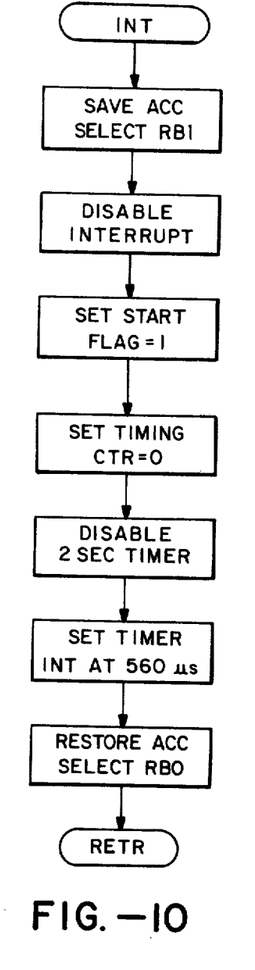

Referring now to FIG. 10, the interrupt (INT) routine is depicted in which the system initially saves the accumulator and selects the desired register bank (in the preferred embodiment there are two internal register banks within microprocessor 151—RB0 and RB1).

Initially, the system is looking for a valid start bit which is determined as a function of time. The system therefore disables interrupts and looks for a valid start bit.

In ASCII format, the start bit is analyzed by microprocessor 151 during the Set Start Flag=1 routine. To do this, a timing counter (internally) is set to 0 and the system looks at a start pulse.

In order that the system not time out, an internal two-second timer is disabled (in the event it had been previously enabled). To check if the start bit is valid, the system will go to the Timer Interrupt routine, which occurs 560 usec later.

Figure 11:
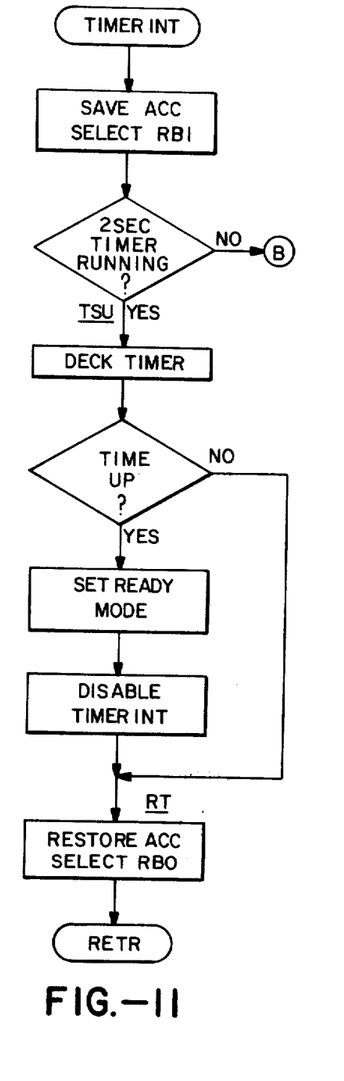

In FIG. 11, the Timer Interrupt routine saves the accumulator and selects register bank 1. If the two-second timer is not running, the system goes to step "B," depicted in FIG. 12. If the two-second timer is running, the system will decrement the timer, set the ready mode and disable the time interrupt when the time is up.

Figure 12:
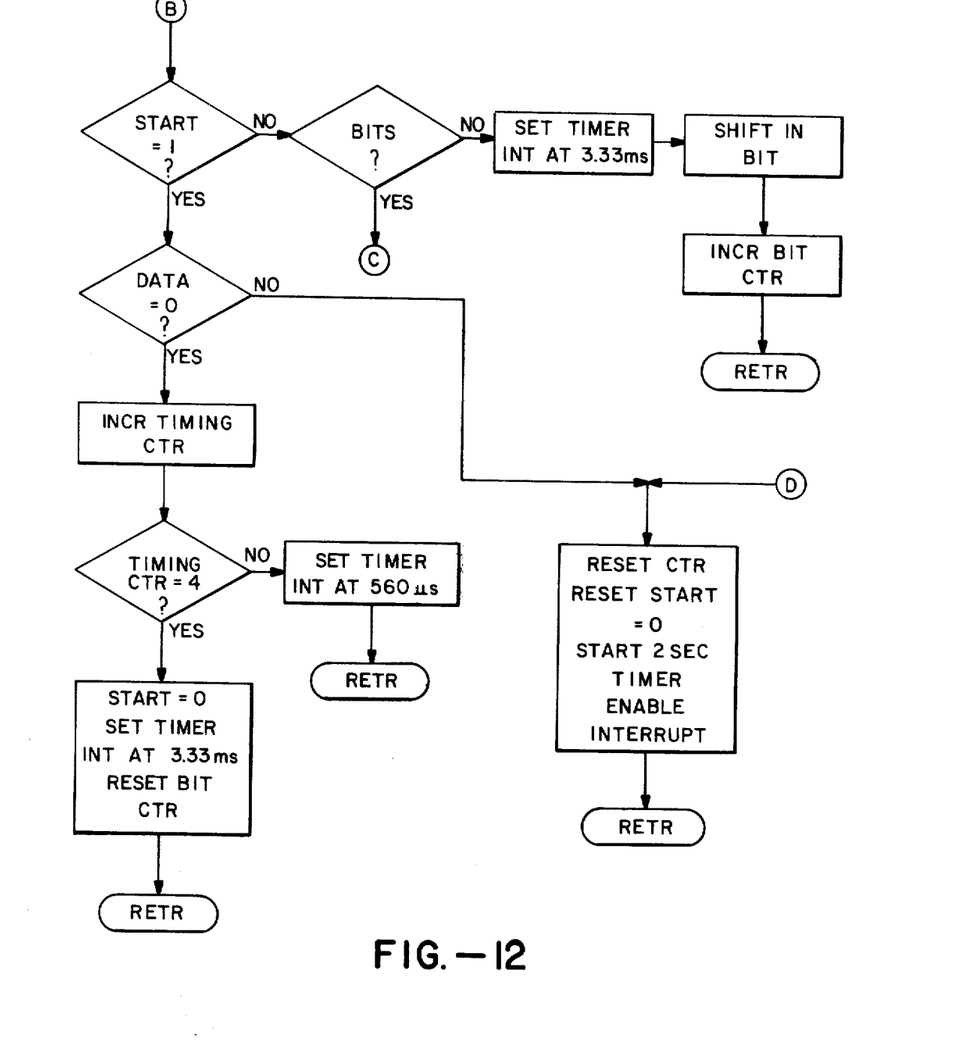

In FIG. 12, the first step in routine B is to determine whether the start bit is being examined. If so, the system examines the data and, if not 0, enters routine D, in which counters are reset, start flag is reset to 0, the two-second timer is started, and the interrupt of FIG. 10 is enabled.

If Data=0, the timing counter is incremented, which in a preferred embodiment will be counting to 4. If the counter reaches 4, the system begins looking for data (start=0), sets the timing interrupt to 3.33 milliseconds (since in ASCII format, data bits occur every 3.33 ms), and the bit counter is reset.

In routine B, if Start=0 (looking for data), it is determined whether bit 9 has been reached (ASCII format utilizes 8-bit format). If bit 9 has not been reached, the system continues with setting the timer interrupt at 3.33 ms, shifting in bits and incrementing the bit counter.

Figure 13:
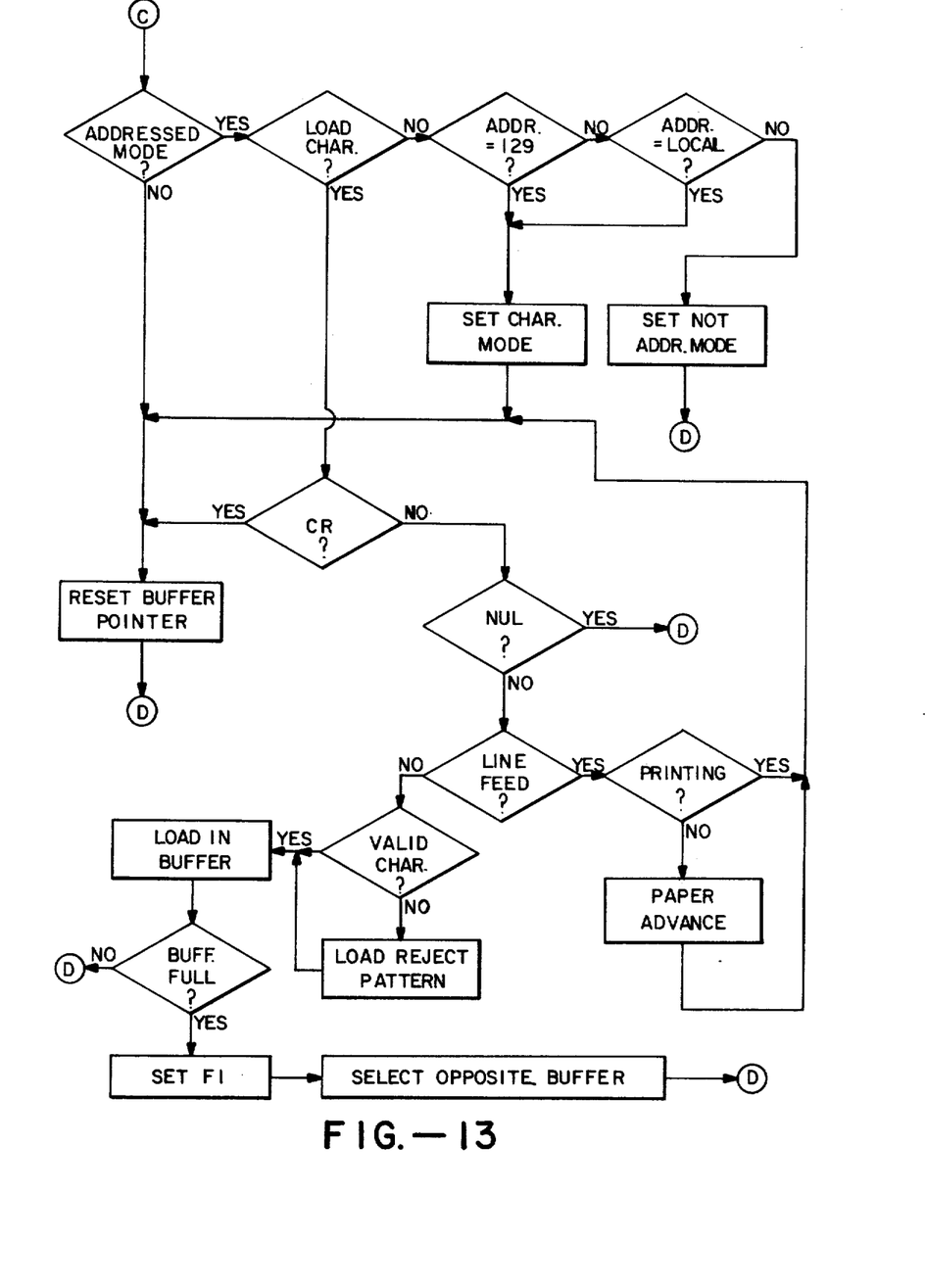

When bit 9 is reached, the system goes to Step C depicted in FIG. 13, in which the Addressed mode is checked to determine if a good address has been received. If so, the load character mode is checked to see if the system is looking for an address or a character. If looking for an address, the routine checks for address=129 or address=local (for the switch position contained within the printer). If a valid address is found, the system is set to a mode (character mode) and exits to loop D in order to receive characters.

If a character has been loaded, control characters are first checked. If a control character is not present, the system determines whether a valid character is present.

If no valid character is present, the system prints an asterisk or some other reject character. If a valid character is present, the buffer will be loaded, and when full the system sets the F1 flag bit and selects the opposite register bank. The print routine of FIG. 9 will thus be enabled.

Further details of the printer 64 are described in more detail in the cross-referenced application entitled "Thermal Message Printer".

In order to more completely illustrate the capabilities of the present invention, a cycle of operation will be described in conjunction with the flow diagrams depicted in FIGS. 14-17.

Figures 14, 15:
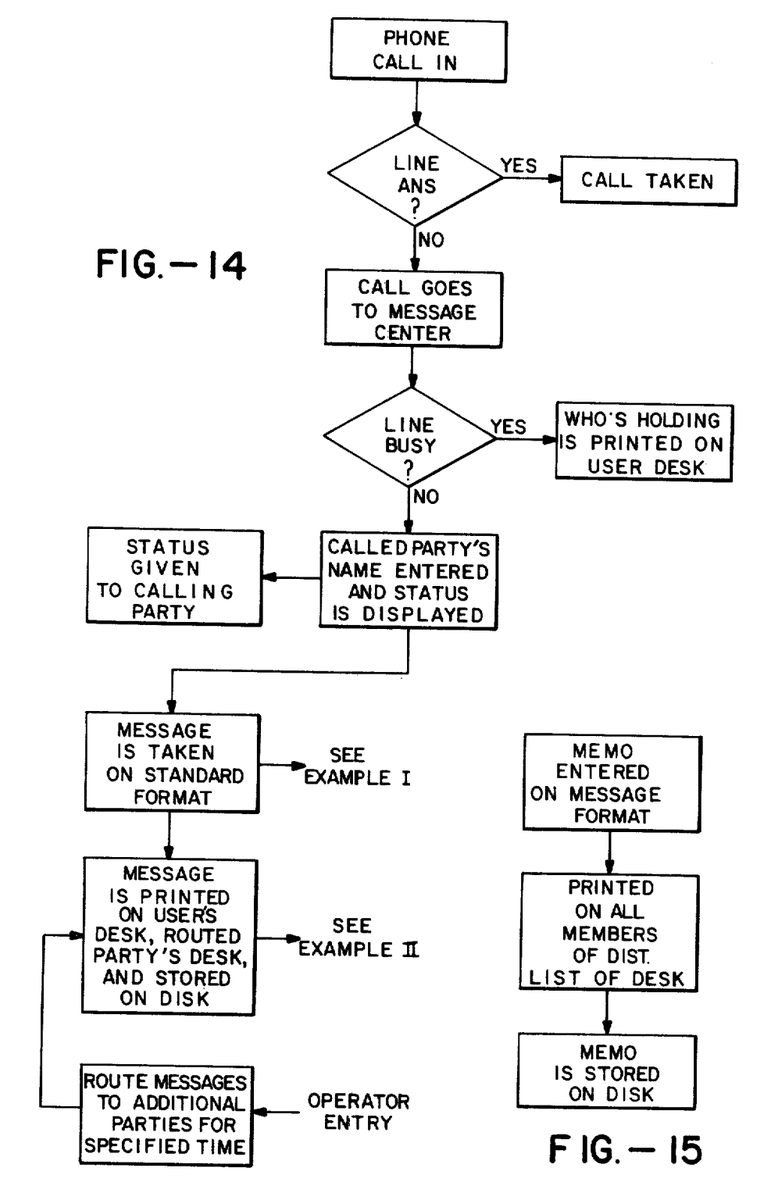
FIGS. 14–18 depict flow diagrams for describing the operation of the system.

Referring now to FIG. 14, assume an incoming telephone call is received in an office complex at a receptionist's station located at a central location within the complex. The receptionist transfers the call to the desired person, and if the person is available, the call is taken at his particular location.

If the desired person's telephone line is busy, the receptionist utilizes the keyboard terminal display 10 of FIG. 1 to transmit, under control of computer 11, a message to a remote message printer at a user's desk, which prints a message identifying the calling party and the message, if any.

If the desired person's line is not busy but that person is unavailable, the status function of the present invention can be utilized by the receptionist.

To do this, the called party's name is entered into the computer 11 and that person's status is displayed on the keyboard terminal display 10, from which the receptionist can relay the information to the calling party.

Assuming a message is to be taken from the calling party, the system provides the capability of taking the message in a standard format, and the receptionist then merely enters the person's name and company in order to complete the message information.

For example, a typical format is set forth below in Example I in which the data and time are displayed on the monitor of the keyboard display terminal 10 at all times, and the message format is displayed to simplify the message communication procedure.

EXAMPLE I

To:
From:
Company:
Phone:

| PLEASE CALL | URGENT | WILL CALL AGAIN | RETURNED CALL |

Message:

In Example I, the message format illustrated shows that the receptionist need only enter the called person's name, company and telephone number and an indication whether the phone call is urgent, whether the call should be returned or any other predetermined status format. By utilizing a standard format, the procedure of communicating a message to a user's location can be completed quickly and easily with little chance of error.

The message is then printed at the user's desk as set forth in Example II. Also, the message is typically stored in the diskette memory 13 of FIG. 1 for maintaining a permanent record of all messages incoming to the office complex.

EXAMPLE II

TO: PAUL
FROM: MR. JOHNSON
COMPANY: UPI

```
PHONE: 770-9980 9980
PLEASE CALL
HE HAS THE DATA ON THE STOCK ISSUE TO BE
APPROVED BY THE STATE CORP. COMMISSIONER
THUR JAN 31, 1980 10:08 AM #2
```

The system also has the capability of displaying memoranda for communication to desired personnel within the office complex.

The system has the ability to send a "Party Holding" notification to the user's remote printer when a called user is on the telephone.

In FIG. 15, a brief cycle of operation is depicted in which a memo in a message format is entered through the keyboard display terminal and the memo is then printed at the desired location(s) within the office compex.

In one embodiment, the memo comprises a series of twelve message lines with eighty characters per line. A suitable message printer is described in more detail in the cross-referenced application entitled "Thermal Message Printer".

The memo can also be stored in diskette memory for maintaining a permanent record at the central location of the office complex.

Figures 16, 17, 18:
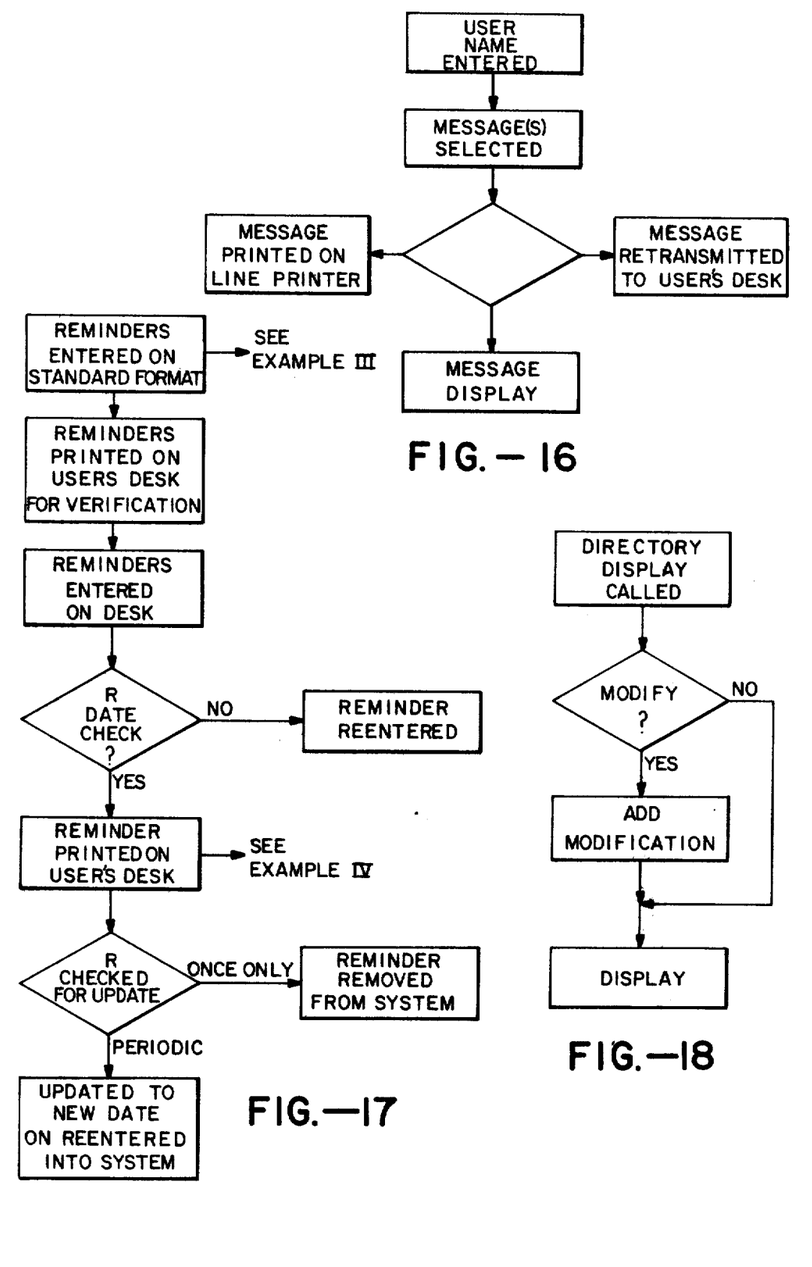

The system also has a message recall capability as depicted in FIG. 16, in which the user's name is entered in the keyboard display terminal and the central processing unit 11 controls the display of any messages to the particular user on the line printer in a format such as depicted in Example III. By storing the message in diskette memory 13, the message can be retransmitted at any time to the user's desk.

EXAMPLE III

```
TO: DON MC CREA
FROM: FRED HOME
COMPANY: SEATTLE OFC.
CALLED . . . PLEASE CALL
TALKED WITH RAY BROWN OF QUALITY CONTROL
MAGAZINE, WOULD LIKE AN ARTICLE WRITTEN
FINANCIAL OR TECHNICAL BY SOMEONE HERE.
RAY BROWN'S NBR: 312-665-1000.
FRI SEP 7, 1979 11:37 AM #10
TO: DFM
FROM: FOR BILL M. FROM LINDA
PHONE: 854-7090
CALLED . . . PLEASE CALL
FRI SEP 7, 1979 4:46 PM #11
```

The system capability also incorporates a calendar function depicted in FIG. 17 which provides reminders to selected personnel of important dates, which are entered into the system on a standard format, such as illustrated in Example IV.

EXAMPLE IV

```
TO: DON ALLEN
FROM: AMTEL MESSENGER SERVICE
REPEAT REMINDER WEEKLY
WEEKLY STAFF MEETING AGENDA
FRI OCT 19, 1979 #1
TO: DON ALLEN
FROM: AMTEL MESSENGER SERVICE
REPEAT REMINDER MONTHLY
REMEMBER MONTHLY REPORT
THURS OCT 25, 1979 #2
TO: DON ALLEN
FROM: AMTEL MESSENGER SERVICE
REPEAT REMINDER ANNUALLY
REMEMBER MICHAEL'S BIRTHDAY ON
THE 20TH AND MARY'S ON THE 26TH
SAT DEC 15, 1979 #3
```

The calendar function provides important reminders to selected users' desks. Initially the reminders are printed for verification by the user. Upon verification, the reminders are entered into diskette memory under control of the central processing unit.

A suitable format for providing calendar messages to a particular user are illustrated in Example IV, which can provide daily, weekly, monthly, quarterly, semi-annual and/or annual message information to a selected user. Monthly reports, quarterly statements, monthly meetings, and important anniversary dates can be "remembered," thereby providing an important calendar function for relaying important information such as docketing information, court dates, important meetings and the like. Next required notification dates are updated automatically.

The system provides means for displaying a directory of users on the keyboard display 10. As depicted in FIG. 18, the directory can be modified to include changes in user names, pseudonyms, printer addresses, or distribution lists.

The system provides the capability of recall and display of messages in order that those messages can be read and resent to selected ones of the users at one or more remote locations.

The system can also temporarily route messages to any one of the remote locations in the event that a user is not available at his usual remote location and can send special "party holding" notification messages to those users who may be occupied with another telephone call.

Although one embodiment of the present invention has been illustrated for a message communication system, other variations of the present invention are possible. For example, the communication system could perform the transmission of a message or an important calendar date, but also can control equipment located at a remote location in a complex by utilizing message transmission techniques as described hereinabove.

What is claimed is:

1. In an office complex, a message communication system comprising:
    means for generating an analog carrier signal,
    means for modulating said analog carrier signal with a digital message signal such that said digital message signal is phase coherent with said analog carrier signal, said digital message signal including information identifying a unique address or set of unique addresses of one or more of the plurality of remote locations,
    means for transmitting said message signal from a first central location over an office power line to a group of remote locations, and
    message display means each having one or more unique destination address means corresponding to said specified information and responsive to said transmitted message signal for displaying said message.

2. A message communication system comprising means for generating an analog carrier signal, means for modulating said analog carrier signal with a digital message signal such that said digital message signal is phase coherent with said analog carrier signal, said digital message signal including information identifying a unique address or set of unique addresses of one of a plurality of remote locations, means for transmitting said modulated carrier signal from a central location to a plurality of remote locations, each of said remote locations including a message receiver where one of said message receivers has one or more unique address means corresponding to said specified addresses, said message receivers each including means responsive to said modulated carrier signal for generating a digital data stream corresponding to said message, control means responsive to said data signal for generating drive control signals corresponding to said message, and means responsive to said drive control signals for displaying said message.

3. In an office complex, a message communication system comprising means for generating an analog carrier signal, means for modulating said analog carrier signal with a digital message signal such that said digital message signal is phase coherent with said analog carrier signal, said digital message signal including information identifying a unique address or set of unique addresses of one or more of the plurality of remote locations, means for transmitting said phase coherent message signal from a first central location over an office power line to a group of remote locations and message printer means located at each of said remote locations, each of said message printer means having one or more unique destination address means corresponding to said specified information and responsive to said transmitted phase coherent message signal for displaying said message.

4. A system as in claim 3 wherein said transmitter means include means for generating a carrier signal and means for modulating said carrier signal with a message signal such that said message signal is phase coherent with said carrier signal.

5. A system as in claim 4 wherein said transmitter means include means for generating a carrier signal and means for digitally modulating said carrier signal with a message signal such that said message signal is phase coherent with said carrier signal.

6. A system as in claim 5 wherein said carrier signal includes a sinusoidal signal.

7. A system as in claim 6 including means for frequency modulating said carrier signal.

8. A system as in claim 4 including means for forming a frequency shift keyed signal having first and second states representing said message.

9. A system as in claim 4 including switchable filter means responsive to said modulated carrier signal for generating sinusoidal signals below a predetermined frequency and corresponding to said modulated signal.

10. A system as in claim 4 including VMOS power driver means for generating a power output signal.

11. A system as in claim 3 wherein said printer means include means responsive to a transmitted modulated carrier signal representing a message for generating a digital data stream corresponding to said message, control means responsive to said data signal for generating control signals corresponding to said message, and means responsive to said control signals for displaying said message.

12. A system as in claim 11 wherein said carrier signal is frequency modulated.

13. A system as in claim 12 wherein said modulated carrier signal is sinusoidal.

14. A system as in claim 11 wherein said data stream is in serial format.

15. A system as in claim 11 wherein said control means include microprocessor means.

16. A system as in claim 11 wherein said printer means includes a line printer for printing said message in hard copy form.

17. A system as in claim 11 wherein said printer means include a thermal printer for printing said message in hard copy format.

18. A system as in claim 17 including means for sequentially printing said message in columns of text.

19. In an office complex, a message communication system comprising means for transmitting a message signal having specified information including information identifying a unique address or set of unique addresses of one of a plurality of remote locations from a first central location over an office power line to a group of remote locations, and message printer means located at each of the remote locations, each of said message printer means having one or more unique destination address means corresponding to said specified information and responsive to said transmitted message signal for displaying said message, said message printer means including a low Q input filter for filtering said transmitted message signal.

20. A system as in claim 11 including means for generating a frequency variable control signal, tone decoder means for comparing the phase of the receiver carrier signal with said control signal to obtain phase coherency corresponding to said transmitted phase coherency, and means for checking said phase coherency for a predetermined period of time.

21. In an office complex, a message communication system comprising means for generating an analog carrier signal, means for modulating said analog carrier signal with a digital message signal such that said digital message signal is phase coherent with said analog carrier signal, said digital message signal including information identifying a unique address or set of unique addresses of one or more of the plurality of remote locations, means for transmitting a message signal having specified information including information identifying a unique address or set of unique addresses of one of a plurality of remote locations from a first central location over an office power line to a group of remote locations and message printer means located at each of said remote locations, said message printer means having one or more unique addresses corresponding to said specified information responsive to said transmitted message signal for displaying said message.

22. In an office complex, a message receiver comprising means connected to an office power line responsive to a message signal transmitted over said power line representing a message for generating a digital data stream corresponding to said message, control means responsive to said data signal for generating control signals corresponding to said message, means responsive to said control signal for displaying said message, said means for generating including a low Q input filter for filtering said transmitted message signal.

23. In an office complex, a message receiver comprising filter means responsive to a transmitted modulated carrier signal representing a message where said message is phase coherent with said carrier signal for generating a digital data stream corresponding to said message, means for generating a frequency variable control signal, tone decoder means for comparing the phase of the receiver carrier signal with said variable control signal to obtain phase coherency corresponding to said transmitted phase coherency, means for checking said phase coherency for a predetermined period of time, control means responsive to said digital data stream for generating control signals corresponding to said message, and means responsive to said control signals for displaying said message.

24. In an office complex, a message receiver comprising
means connected to an office power line responsive to a phase coherent message signal transmitted over said power line representing a message for generating a digital data stream corresponding to said message, control means responsive to said data signal for generating control signals corresponding to said message, and
means responsive to said control signal for displaying said message.

25. A receiver as in claim 24 wherein said message signal is frequency modulated.

26. A receiver as in claim 25 wherein said modulated message signal is sinusoidal.

27. A receiver as in claim 24 wherein said data stream is in serial format.

28. A receiver as in claim 24 wherein said control means include microprocessor means.

29. A receiver as in claim 24 wherein said display means include printer means for printing said message in hard copy form.

30. A receiver as in claim 29 wherein said printer means include a thermal printer.

31. A receiver as in claim 30 including means for sequentially printing said message in columns of text.

32. A receiver as in claim 24 including means for generating a frequency variable control signal, tone decoder means for comparing the phase of the receiver carrier signal with said control signal to obtain phase coherency corresponding to said transmitted phase coherency, and means for checking said phase coherency for a predetermined period of time.

33. In an office complex, a message communication system comprising
memory means,
operator controllable key word terminal means located at a central location in said complex for entering one or more operator controllable message signals each having specified information including information identifying a unique address or set of unique addresses of one of a plurality of remote locations into said memory means,
means for generating and transmitting specified ones of said message signals from said central location over an office power line to a group of remote locations, said means for generating including means for generating an analog carrier signal,
means for modulating said analog carrier signal with a digital message signal such that said digital message signal is phase coherent with said analog carrier signal,
message display means having one or more unique address means corresponding to the specified information in a specified one of the transmitted message signals, and
control means for controlling the operation of said system.

34. A system as in claim 33 including line printer means for displaying a record of said stored message signals.

35. A system as in claim 33 wherein said keyboard terminal means include means for displaying a predetermined message format and means for entering information together with said predetermined message format thereby forming a message signal.

36. A system as in claim 33 wherein each of said locations includes means for indicating the status of the respective location and wherein said keyboard terminal means include means for displaying the status of one or more users of said message display means located at each of said remote locations.

37. A system as in claim 33 wherein said keyboard terminal means includes means for recalling and displaying selected ones of said messages, and means for transmitting selected ones of the displayed messages to selected ones of said one or more remote locations.

38. A system as in claim 33 wherein said keyboard terminal means includes means for temporarily routing selected ones of said messages for one or more users of said remote message display means to one or more additional remote locations.

39. A system as in claim 33 wherein said keyboard terminal means includes means for transmitting party holding notification messages to selected ones of said message display means located at said remote locations.

40. A system as in claim 33 wherein said keyboard terminal means includes means for displaying a directory of users of said remote message display means and means for modifying said directory.

41. A system as in claim 33 including means for displaying predetermined calendar messages at one or more of said remote locations.

* * * * *